(12) United States Patent
Jones

(10) Patent No.: US 8,297,317 B2
(45) Date of Patent: Oct. 30, 2012

(54) GAS VALVE WITH DUAL OUTLETS

(75) Inventor: James Dean Jones, Linden, TN (US)

(73) Assignee: Lincoln Brass Works, Inc., Waynesboro, TN (US)

( * ) Notice: Subject to any disclaimer, the term of this patent is extended or adjusted under 35 U.S.C. 154(b) by 449 days.

(21) Appl. No.: 12/639,042

(22) Filed: Jan. 21, 2010

(65) Prior Publication Data

US 2011/0174405 A1    Jul. 21, 2011

(51) Int. Cl.
*F16K 11/083* (2006.01)
(52) U.S. Cl. .................................. 137/625.47
(58) Field of Classification Search ............. 137/625.47, 137/887
See application file for complete search history.

(56) References Cited

U.S. PATENT DOCUMENTS

| | | | | |
|---|---|---|---|---|
| 2,095,064 A | * | 10/1937 | Harper | 137/625.12 |
| 2,162,233 A | * | 6/1939 | Schoenberger | 137/625.12 |
| 2,855,955 A | * | 10/1958 | Lamar | 137/599.17 |
| 2,855,956 A | * | 10/1958 | Huff et al. | 137/625.32 |

* cited by examiner

*Primary Examiner* — John Fox
(74) *Attorney, Agent, or Firm* — Harness, Dickey & Pierce, P.L.C.

(57) ABSTRACT

A dual outlet fluid valve capable of obtaining a closed state operation mode for both outlet ports, a low flow operation mode for either operating port either individually or combined, or a high flow operation mode for either outlet port individually or combined such that at least five distinct operating conditions can be obtained. The fluid valve is not charged with fuel when in a closed position.

19 Claims, 7 Drawing Sheets

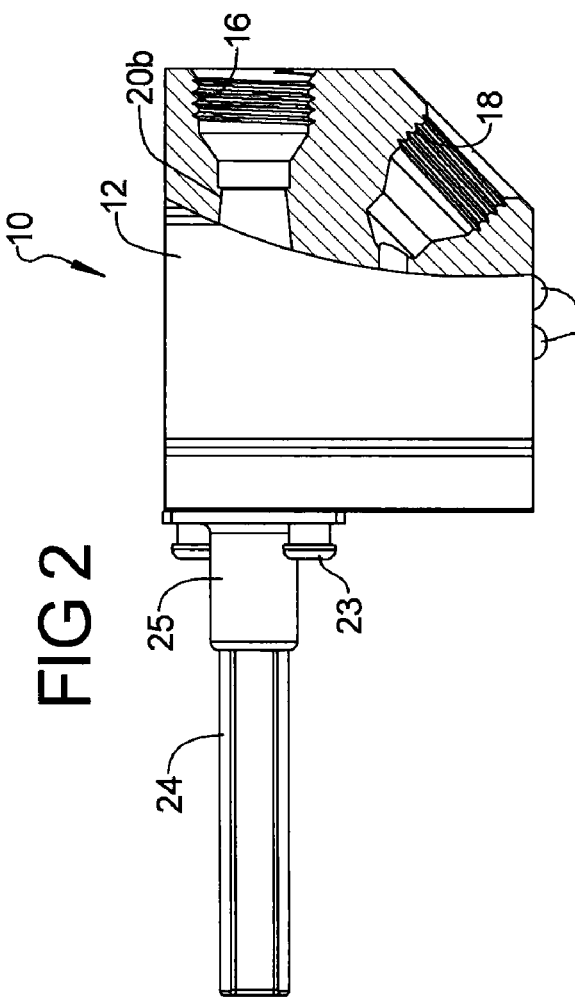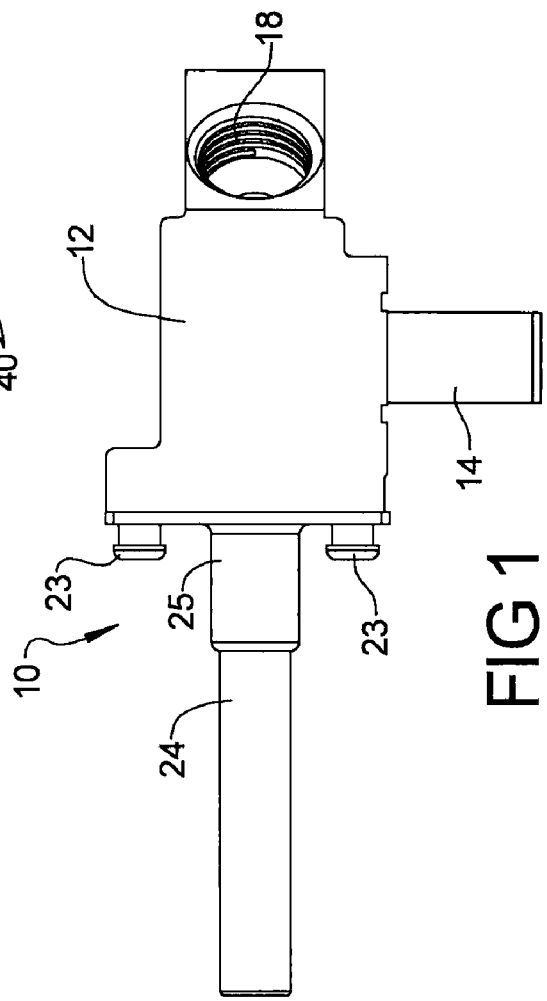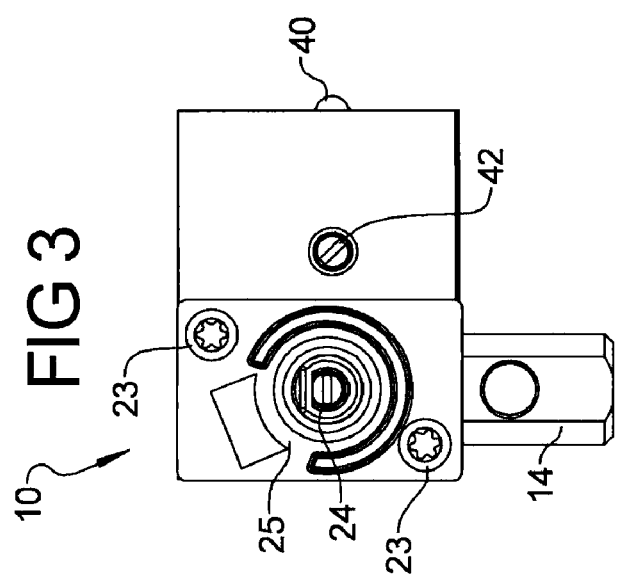

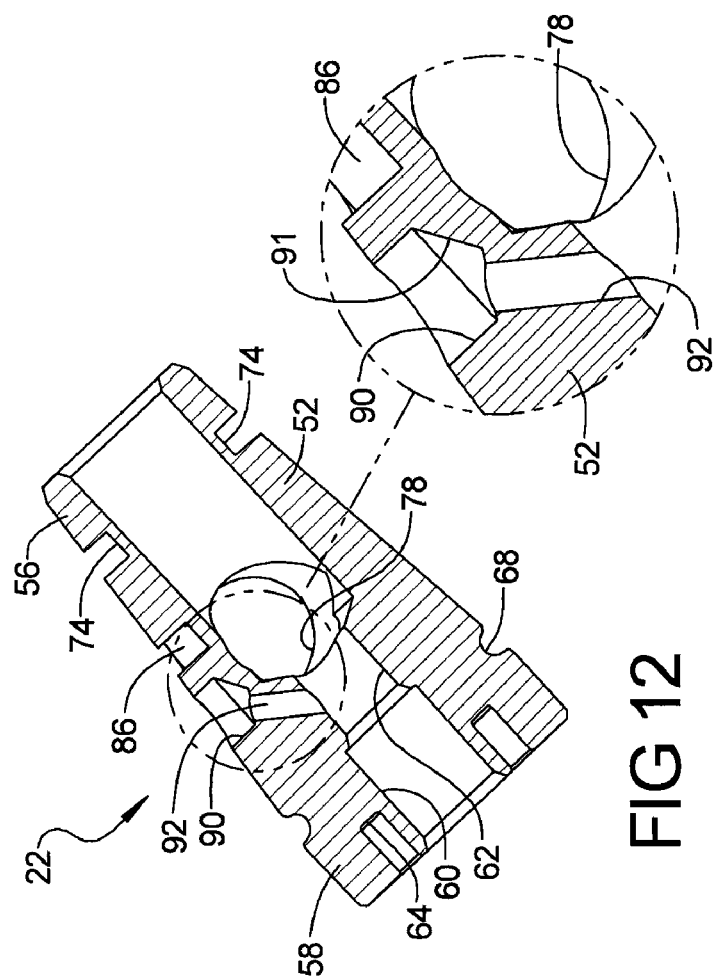
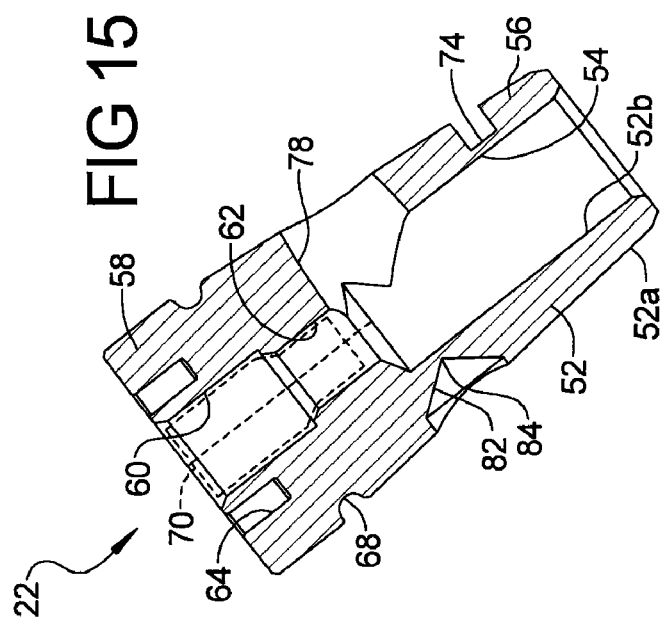

GAS VALVE WITH DUAL OUTLETS

FIELD

The present disclosure relates to a fluid valve, and more particularly, to a dual outlet gas valve.

BACKGROUND AND SUMMARY

The statements in this section provide background information related to the present disclosure which is not necessarily prior art. This section also provides a general summary of the disclosure, and is not a comprehensive disclosure of its full scope or all of its features.

It is generally known to provide a dual outlet gas valve for controlling the supply of gas to a pair of burners. One such exemplary valve is disclosed in U.S. Pat. No. 7,096,887, which is owned in part by the parent company of the assignee of the present disclosure and is incorporated by reference herein. The present disclosure provides a dual outlet gas valve that allows different rates of gas flow therethrough so that relatively high and relatively low flames may be selectively applied to a pair of burners in several alternative modes of operation.

The present disclosure provides a dual outlet gas valve assembly including a valve body having a bore for receiving a valve plug member. The valve body includes a main cavity in communication with an inlet passage and a pair of outlet passages. A primary outlet port may be provided in communication with the main cavity, and a secondary outlet port may be provided in communication with each of the pair of outlet passages. A plug member is rotatably received in the main cavity and has a wall defining a bore extending axially from a first end of the plug member. The wall has a thickness extending radially from an interior surface to an exterior surface. The plug member may include a dual flow aperture extending radially from the bore through the wall and may be operable for selectively providing either high flow output through the primary outlet port or low flow output through the secondary outlet port. The plug member may include a slot that extends partially inward from the exterior surface of the wall. The slot may be axially aligned to provide selective fluid communication between the inlet and one of the pair of outlet passages for providing high flow output to the secondary outlet port.

In various aspects, the plug member is rotatable to provide selective fluid communication between the inlet passage and at least one of the outlet passages via the dual flow aperture. With selective adjustment of the position of the valve plug member, the first and second outlets of the dual outlet fluid valve can individually be provided with a low flow, high flow, or a closed operating state.

In certain aspects, when the valve is in a closed or locked position, at least one of outlet ports is in communication with the plug member bore such that the fluid valve is not charged with fuel.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Corresponding reference numerals indicate corresponding parts throughout the several views of the drawings.

FIG. 1 is a side plan view of a dual outlet valve assembly according to the principles of the present disclosure;

FIG. 2 is a top plan view of the dual outlet valve assembly shown in FIG. 1 with a pair of outlets in phantom view;

FIG. 3 is a front plan view of the dual outlet valve assembly shown in FIG. 1;

FIGS. 9A-9E are five side perspective views of the valve plug member of FIG. 9, illustrated at the specified circumferential degree of viewing rotation;

FIG. 12 is a cross-sectional view of the valve plug member taken along line 12-12 of FIG. 9C;

FIG. 13 is an enlarged view of a portion of the valve plug member as shown in FIG. 12;

FIG. 15 is a cross-sectional view of the valve plug member taken along line 15-15 of FIG. 9E.

DETAILED DESCRIPTION

Figure 4:
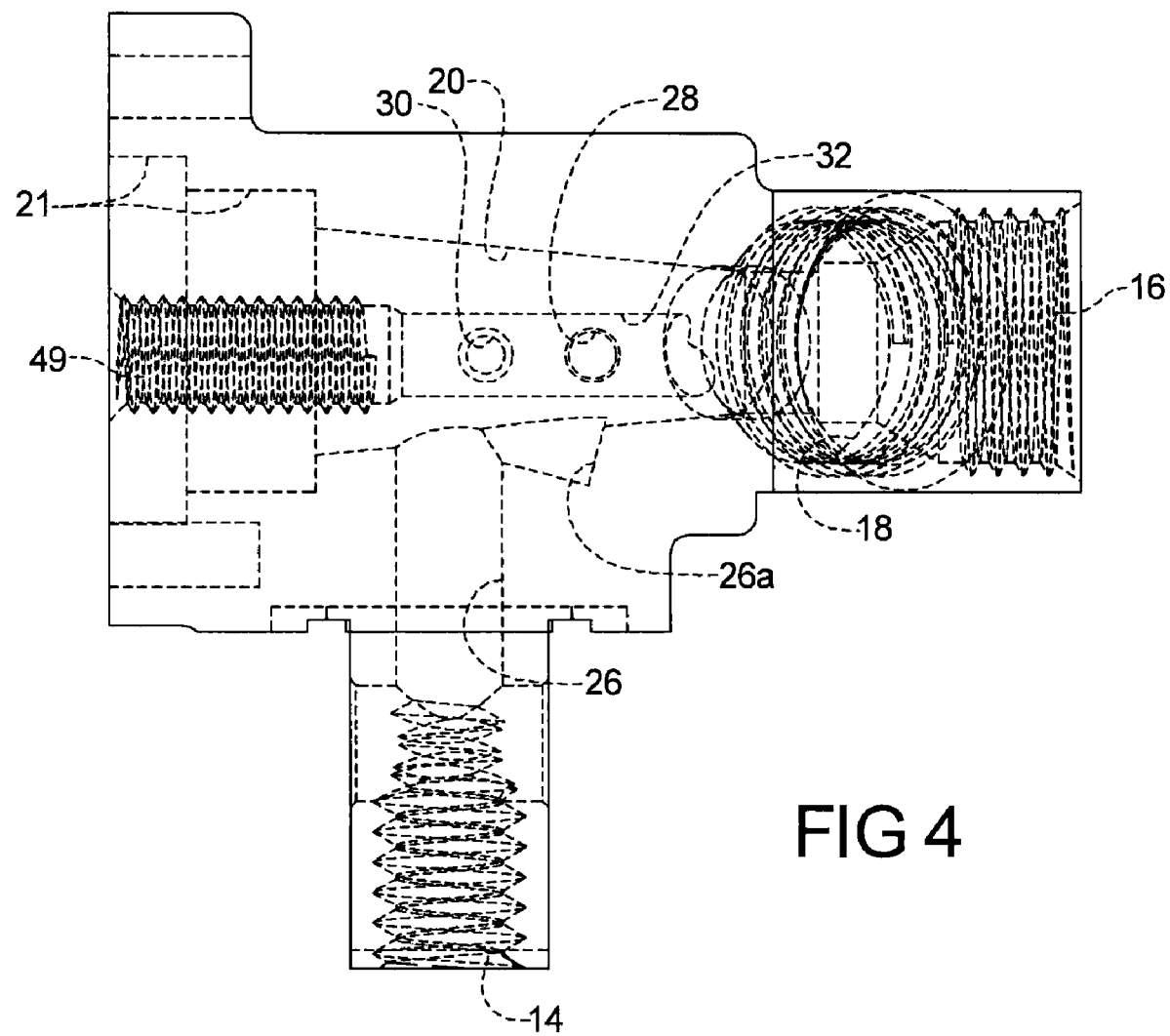
FIG. 4 is a side phantom view of a dual outlet valve body.
Figure 5:
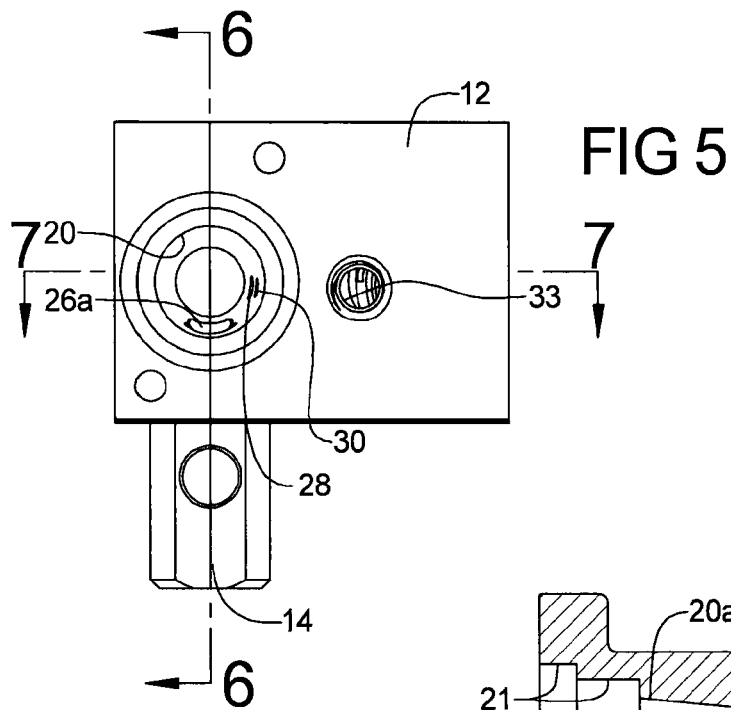
FIG. 5 is a front plan view of the dual outlet valve body shown in FIG. 4.

The following description is merely exemplary in nature and is not intended to limit the present disclosure, application, or uses. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

With reference to the accompanying figures, example embodiments of the dual outlet fluid valve 10 according to the principles of the present disclosure will now be described. Dual outlet fluid valve assembly 10 includes a valve body 12 having an inlet port 14, a first outlet port 16, and a second outlet port 18, best shown in FIGS. 1-7. A dual outlet fluid valve assembly according to the present disclosure may include a dual ring burner. When used to control the flow of gas to a dual ring burner, for example, the first outlet port 16 of the assembly 10 may be used to selectively provide gas to an outer ring while the second outlet port 18 may be used to selectively provide gas to an inner ring. Other combinations are contemplated with other burner types, depending on design preferences. A fully assembled gas valve assembly may include a detachable control knob. In certain embodiments, a detachable ignition switch is provided to enable electronic ignition of a burner unit when the valve stem is rotated to a specific location.

The main valve body 22 may be made of a metal material, such as aluminum, by appropriate casting or forging methods. Various ports, passages, and bores can be formed in the main valve body 22 using drilling operations known to one skilled in the art. The ports can be shaped provided with apertures and one or more threaded portions for connection to various manifolds, gas tubing, and other connecting devices. Recessed areas may also be provided to house gaskets or other sealing members (not shown).

Figure 6:
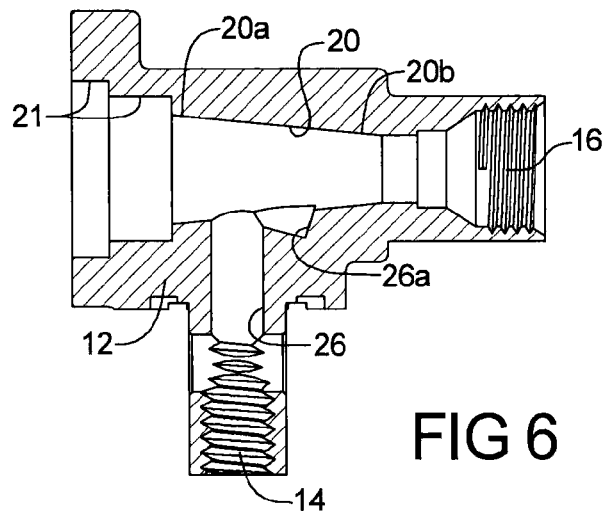
FIG. 6 is a cross-sectional view of the dual outlet valve body taken along line 6-6 of FIG. 5.
Figure 7:
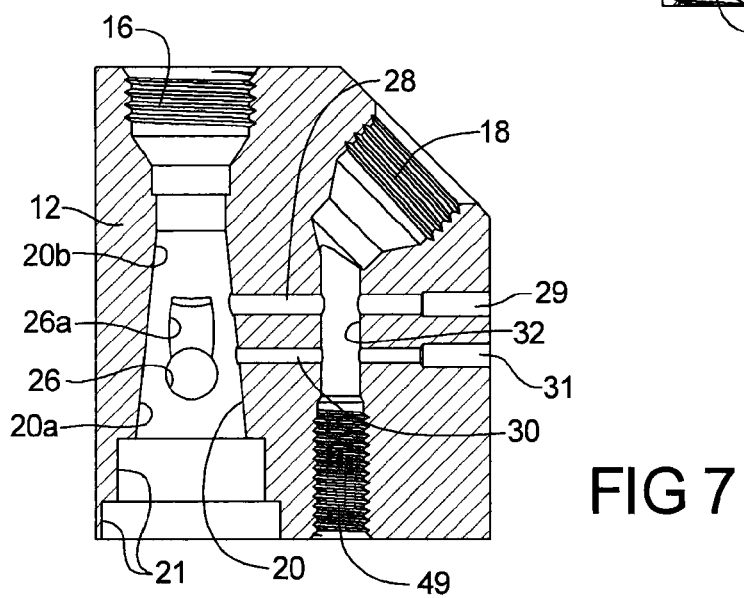
FIG. 7 is a cross-sectional view of the dual outlet valve body taken along line 7-7 of FIG. 5.

As best shown in FIGS. 6 and 7, the valve body 12 defines a bore 20. The bore 20 may be tapered, having a first end 20a and a second end 20b, wherein the first end 20a has a diameter larger than the second end 20b. One or more counter-bores 21 of various diameters may be provided adjacent bore 20 in order to provide clearance for a valve member 22 and accompanying valve stem 24. A tapered valve member 22, shown in FIGS. 9-15 is received in the main cavity, or bore 20 of the valve body 12.

A typical valve stem 24 may be removably attached to the valve body 12 for rotating the valve member 22 within the bore 20 of valve body 12 as shown in FIGS. 1 and 2. The valve stem 24 may be secured to the valve body 12 using a retaining cover plate 25 and fastening members 23 as is known in the art. The retaining cover plate 25 may have an integral upstanding collar portion for minimizing wobble of the valve stem. The retaining cover plate 25 can be configured with numerous stops, notches, tangs, or protrusions (not shown) that may limit rotation of the valve member 22, thereby allowing the valve stem 24 to be stop at different positions, including being in a locked position when not in use. Such an embodiment allows for multiple operating conditions by simple rotation of a valve stem. In certain aspects, a spring mechanism (not shown) is provided to coordinate with the valve stem 24 such that the valve stem 24 must be depressed prior to rotating the valve member 22 out from an off, or locked, position. It is contemplated that the valve member 22 of the present disclosure may be rotated at least about 270 degrees, thus enabling numerous variable flow settings to the outlet ports 16, 18. The valve stem 24 may be hollow and define an opening extending the entire length of the stem.

With reference to FIGS. 4-7, the valve body 12 includes an inlet passage 26 which communicates with the bore 20 and inlet port 14. More specifically, the inlet passage 26 extends radially inward from the inlet port 14 to the bore 20. The inlet passage 26 may be formed by a drilling operation. Inlet passage 26 is connected with an axially extending portion 26a as best illustrated in FIGS. 4 and 6. The axially extending portion 26a may also be formed by a drilling process which (as shown) is angularly offset by an angle of approximately 10 degrees from an axis of the bore 20 so as to provide fluid communication between passage 26 and an inner portion of the bore 20. Such a drilling process may include inserting a drill bit into the bore 20 for forming the axially extending portion 26a. As shown in FIG. 7, the axially extending portion 26a is operable to be in selective fluid communication and is aligned with a primary outlet passage 28 and a secondary outlet passage 30, each of which extend radially from the bore 20 of the valve body 12. As shown, the primary and secondary outlet passages 28, 30 may extend in a direction perpendicular to the first outlet port 16. The first outlet port 16 is adjacent the second end 20b of the bore 20. The second outlet port 18 communicates with a common outlet passage section 32 that extends generally perpendicular to the first primary outlet passage 28 and secondary outlet passage 30. As shown, the second outlet port 18 may extend generally diagonally (e.g., about 45 degrees) from the common outlet passage section 32 as shown in FIGS. 2 and 7. The primary outlet passage 28, secondary outlet passage 30 and the common outlet passage section 32 may each be formed by a drilling process in which the passages are each drilled from an exterior surface of the valve body 12. As shown in FIG. 3, the respective ends 29, 31 of the primary outlet passage 28 and secondary outlet passage 30 may then be plugged with balls 40 that are typically press fit into the respective passages and secured by swaging, or other known processes.

Figure 8:
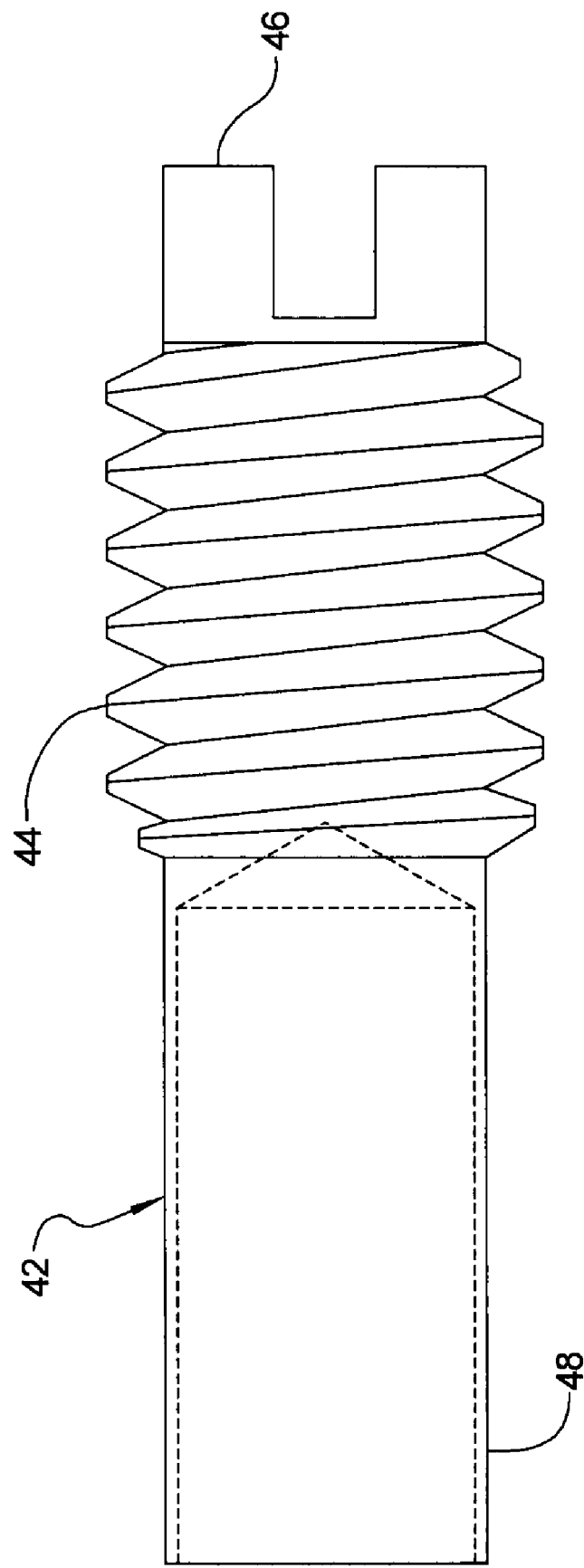
FIG. 8 is a plan view of an adjustment screw according to the principles of the present disclosure.

The end 33 of the common outlet passage 32, opposite from the second outlet port 18, may be closed by an adjustment mechanism, such as an exemplary adjustment screw 42, best shown in FIG. 8, which includes a threaded portion 44, a tool engaging portion 46, and a passage adjustment portion 48 that can be used to selectively adjust the flow through the secondary outlet passage 30 by selectively blocking a portion thereof. The threaded portion 44 engages internal threads 49 at the end 33 of the common outlet passage 32.

With reference to FIGS. 9-15, the valve member 22 will now be described in greater detail. As best shown in FIG. 15, the valve member 22 is a plug-type valve member including a wall, or body portion 52, extending from an exterior surface 52a to an interior surface 52b. The plug member 22 is generally cylindrical or conical in shape such that the shape of the exterior surface 52a of the body portion 52 generally matches an interior surface of the bore 20 defined by the valve body 12. A plug bore 54 is provided within the plug member 22 and extends axially from an inner end 56 in fluid communication with an outer end 58 thereof. As shown near the outer end 58, the plug member 22 may include one or more counter-bores 60 or passageways 62 of various diameters. In certain embodiments, the present invention further provides control means for fine-tune adjustments to a rate of fluid flow for valve assemblies that are equipped with specific flow settings, such as high and low. An appropriate adjustment plug member 70 may be rotatably disposed in the valve member 22 to mate with the counter-bore 60 and/or passageway 62 as shown in phantom in FIG. 15. Preferably, this adjustment feature of the valve member 22 is accessible through the aperture of the valve stem 24 by using an instrument such as a thin bladed screw driver. This adjustment member 70 allows for fine adjustment of gas flow as will be described below. An annular recess 64 and cutout portion 66 may be provided at the outer end 58 for coordinated rotational movement of the valve member 22 with the valve stem 24. An alignment groove 68 may be provided around the perimeter of the valve member 22, if desired.

Figure 9:
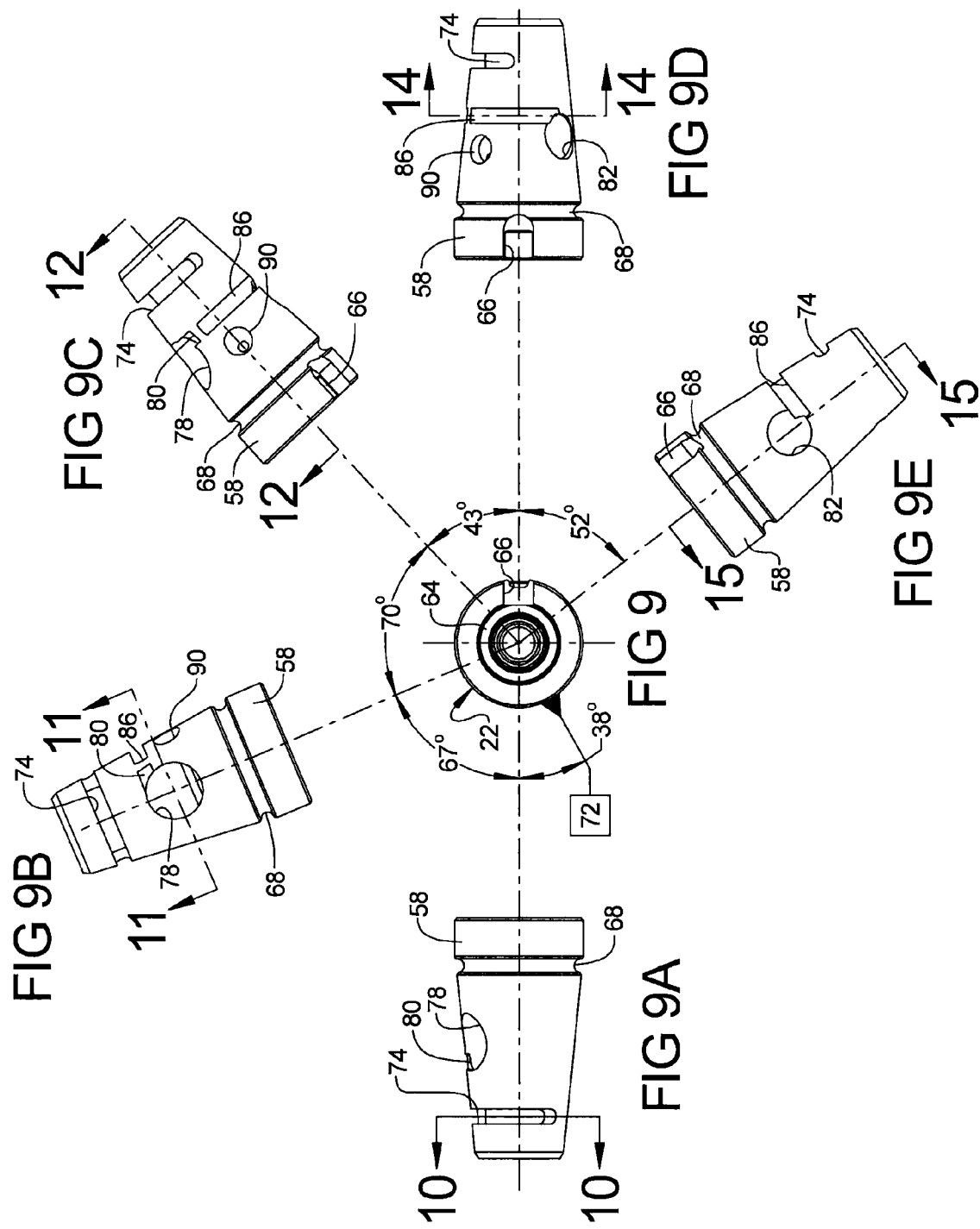
FIG. 9 is a top plan view of a valve plug member according to the principles of the present disclosure.

FIG. 9 illustrates a top plan view of an exemplary plug member 22. FIGS. 9A-9E illustrate five different side perspective views of the valve plug member of FIG. 9, viewed at the specified circumferential degrees of rotation in order to better demonstrate the size and relative locations of a plurality of slots and apertures as will be described below. For example, reference number 72 depicts the valve member 22 set in a locked, off position. FIG. 9A illustrates a side perspective view of FIG. 9 rotated clockwise about 38 degrees from a locked position. FIG. 9B illustrates a side perspective view rotated clockwise about an additional 67 degrees from FIG. 9A. FIG. 9C illustrates a side perspective view rotated clockwise about an additional 70 degrees from FIG. 9B. Likewise, FIG. 9D illustrates a side perspective view rotated clockwise about an additional 43 degrees from FIG. 9C. Finally, FIG. 9E illustrates a side perspective view rotated about an additional 52 degrees from FIG. 9D. Upon being positioned and rotated as shown in FIG. 9E, the valve member 22 no longer rotates in the clockwise direction and can be put back in the locked position, or any other position such as those depicted in FIGS. 9A-9D, by rotational movement in a counter-clockwise direction. It should be understood that alternative rotational combinations may be applicable, depending upon the desired output flow combinations.

During use, the valve member 22 can be rotated within the bore 20 of the valve body 12 to selectively align the inlet passage 26 to provide variable levels fluid communication (i.e., high flow, low flow, etc.) with the first outlet port 16 and the second outlet ports 18 via the outlet passages 28, 30, and 32.

Figure 10:
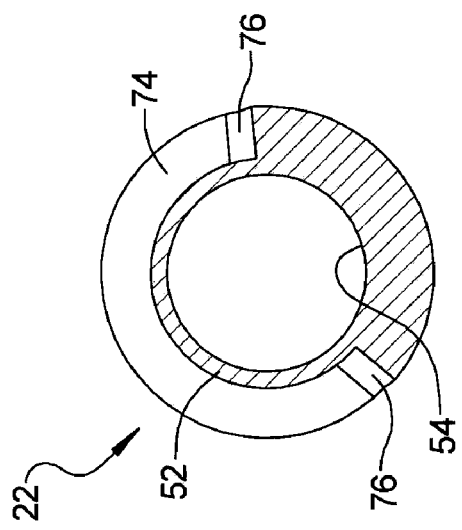
FIG. 10 is a cross-sectional view of the valve plug member taken along line 10-10 of FIG. 9A.

As best shown in FIG. 10, a cross section of FIG. 9A taken along the line 10-10, a radially extending slot 74 is provided extending partially inward from the exterior surface 52a of the body portion 52. The slot 56, as shown, is a partial cut-out and extends a depth of about ½ of the thickness, or greater, of the wall, or body portion 52. In various aspects, the slot opening has angled or chamfered ends 76 and extends a distance of between about 210° to about 225° around the circumference of the exterior surface 52a of the body portion 52 of the plug member 22. In operation, the slot 74 may be axially aligned to provide selective fluid communication between the extending inlet portion 26a and the primary outlet passage 28 leading to the second outlet port 18, for example an inner ring burner.

In addition to slot 74, the present disclosure provides a plurality of other apertures sized and disposed within the valve body 52 to selectively provide fluid communication through the first and second outlet passages 16, 18. A circular dual flow aperture 78 (best shown in FIGS. 9B and 11) extends radially outward from the bore 54 through the body portion 52 and is disposed a distance apart from the slot 74. A small notch 80 is provided adjacent to, and in fluid communication with, the dual flow aperture 78. Accordingly, the dual flow aperture 78 may selectively provide communication directly between the inlet 26 and the primary outlet port 16, to provide high flow output to an outer burner ring, or between the inlet 26 and the secondary outlet passage 30, via fluid communication with the notch 80, to provide additional flow to output port 18, or an inner ring burner.

Figure 14:
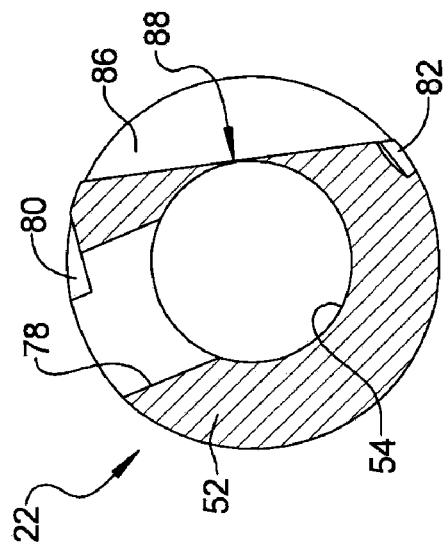
FIG. 14 is a cross-sectional view of the valve plug member taken along line 14-14 of FIG. 9D.
Figure 11:
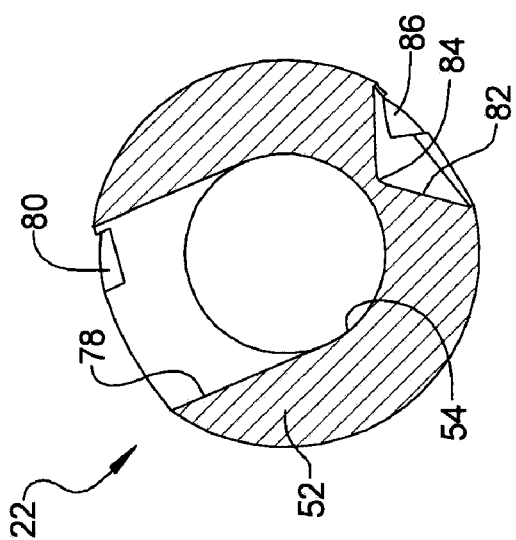
FIG. 11 is a cross-sectional view of the valve plug member taken along line 11-11 of FIG. 9B.

A substantially conical shaped indent 82 (best shown in FIGS. 9D, 9E, 11, and 15) is provided radially aligned with the dual aperture 78. A center point 84 of the conical indent 82 may be disposed roughly a distance of about 180 degrees from the center of the dual aperture 78. The conical shaped indent 82 does not fully extend through the valve wall 52. A cut-out 86 (best shown in FIGS. 9D, 9E, and 14) is provided adjacent to, and in fluid communication with, the conical shaped indent 82. As shown in FIG. 14, the cut-out has a radial distance of about 100 degrees and axially extends a distance into the wall 52 and borders closely against the bore 54 as indicated by reference number 88. In operation, the conical shaped indent 82 is operable to provide selective fluid communication between the inlet 26 and the secondary outlet passage 30, via fluid communication with the cut-out 86, to provide low flow to output port 18, or an inner ring burner.

The present disclosure additionally provides an adjustable, low flow aperture 90 (best shown in FIGS. 9C and 12) extending radially inward from the exterior of the valve 22. The aperture includes a conical portion 91 and a bore, or passageway 92 through the body portion 52 of the valve member 22 at a position angled inward toward the outer end of the valve. In operation, the low flow aperture 90 provides fluid communication between the inlet 26 and the primary outlet port 16 via passageway 92. Flow through this passageway may be fine tuned via the adjustment plug member 70 disposed in the valve member 22. As previously described, this adjustment feature is preferably accessible through the aperture of the valve stem 24 by using a thin bladed screw driver or the like.

In the assembled position, the valve member 22 is retained in the bore 20 of valve body 12, and the slot 74 and various apertures and cut-outs 78, 80, 82, 86, 90, 92 are selectively axially aligned with the outlet passages 28, 30 and primary and second secondary outlet ports 16, 18. 30, 36 of the valve body 12.

With reference to FIGS. 9A-9E, various non-limiting operating positions of the valve member 22 relative to the valve body 12 are shown. Altering the position of the dual flow aperture 78 and low flow aperture 90 selectively provides high and low flow to outlet 16. Altering the position of the slot 74, aperture 78, notch 80, circular indent 82, and cut-out 86 relative to the primary and secondary outlet passages 28, 30 selectively provides high and low flow to outlet 18.

As shown in FIG. 9A, valve member 22 is rotated about 38 degrees in the clockwise direction with reference to the locked position (reference number 72). The valve member 22 is in a position such that only the slot 74 is rotationally aligned with the axially extending inlet portion 26a. Since the slot does not extend through the wall 52, no fluid is delivered to either of the first or second outlet ports 16, 18. The valve is designed such that when a closed position, however, at least the first outlet port 16 is in fluid communication with the inner bore 54 such that the fluid valve is not charged with fuel. For example, any fuel remaining in the valve at the time of closure can escape through outlet 16.

With reference to FIG. 9B, valve member 22 is rotated about 105 degrees clockwise from the locked position so that dual flow aperture 78 is rotationally aligned with the inlet passage 26 and provides fluid communication (high flow) through the first outlet port 16. At the same time, slot 74 is in fluid communication with both the axially extending inlet portion 26a and the primary outlet passage 28 enabling fluid communication (high flow) with the second outlet port 18.

With reference to FIG. 9C, the valve member 22 is rotated about 175 degrees from the locked position such that the dual flow aperture 78 is no longer directly aligned with the inlet passage 26. In this position, however, notch 80 is rotationally aligned with the inlet passage 26 to limited provide fluid communication with secondary passage 30 and slot 74 is aligned with axially extending inlet portion 26a to provide fluid communication with primary passage 28. Thus, second outlet port 18 has high flow. In this arrangement, the inlet passage 26 is also aligned with low flow aperture 90, thus, the first outlet port 16 is provided with a low flow operation condition.

With reference to FIG. 9D, the valve member is rotated about 218 degrees from the locked position such that inlet 26 is aligned with the cut-out 86. Since the cut-out does not extend through the wall 52, no fluid is delivered to the first outlet port 16. However, the axially extending inlet portion 26a is aligned with slot 74, providing fluid communication (high flow) to primary passageway 28 and second port 18.

With reference to FIG. 9E, the valve member 22 is rotated about 270 degrees from the locked position such that only circular indent 82 is aligned with the inlet passage 26. In this position, fluid communication is provided to the secondary passage 30 via cut-out 86 (low flow) to outlet port 18, while the first outlet port 16 is in a closed state.

With the dual outlet fluid valve of the present disclosure, multiple operating conditions can be obtained for the two outlet ports by the simple rotation of a single valve member 22. In particular, at least five different operating conditions, including a closed condition, can be obtained.

In addition, intermediate positions of the valve member can also be utilized to provide intermediate flow conditions where at least one of the primary outlet passage 28 and secondary outlet passage 30 is partially covered. In these intermediate positions, the valve member 22 may provide variable levels of flow.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A fluid valve assembly, comprising:
    a valve body (12) including a main cavity (20), said valve body having: an inlet passage (26, 26a) in communication with said main cavity, a pair of outlet passages (28, 30) in communication with said main cavity, a primary outlet port (16) in communication with said main cavity, and a secondary outlet port (18) in communication with each of said pair of outlet passages (28, 30);
    a plug member (22) rotatably disposed in said main cavity, said plug member having: a wall (52) defining a bore (54) extending axially from a first end (56) of said plug member, said wall having a thickness extending radially from an interior surface (52b) to an exterior surface (52a), a dual flow aperture (78) extending radially from said bore through said wall and operable for selectively providing fluid communication between said primary outlet port (16) and said secondary outlet port (18), and a slot (74) extending partially inward from said exterior surface (52a) of said wall (52), said slot axially aligned to provide selective fluid communication between said inlet (26a) and one of said pair of outlet passages (28).

2. A fluid valve assembly according to claim 1, further comprising a dual ring burner, wherein said primary outlet port (16) provides fluid communication to an outer ring of said dual ring burner.

3. A fluid valve assembly according to claim 1, further comprising a dual ring burner, wherein said secondary outlet port (18) provides fluid communication to an inner ring of said dual ring burner.

4. A fluid valve assembly according to claim 1, wherein said dual flow aperture (78) selectively provides high flow output through said primary outlet port (16), and low flow output through said secondary outlet port (18).

5. A fluid valve assembly according to claim 1, wherein said plug member (22) further comprises a cut-out portion (86) extending radially from said exterior surface (52a) through a portion of said wall (52) of said plug member (22), wherein said cut-out portion (86) provides selective fluid communication between said inlet (26) and said secondary outlet port (18).

6. A fluid valve assembly according to claim 5, wherein said plug member (22) further comprises a substantially conical indent (82) adjacent to, and in fluid communication with, said cut-out portion (86).

7. A fluid valve assembly according to claim 1, wherein said plug member (22) is configured such that said dual aperture (78) and said slot (74) simultaneously provide fluid communication between said inlet (26) and said secondary outlet port (18).

8. A fluid valve assembly according to claim 1, wherein said plug member (22) comprises a notch (80) adjacent to, and in fluid communication with, said dual flow aperture (78).

9. A fluid valve, comprising:
    a valve body (12) including a main cavity (20), said valve body having: an inlet passage (26, 26a) in communication with said main cavity, a pair of outlet passages (28, 30) in communication with said main cavity, a primary outlet port (16) in communication with said main cavity, and a secondary outlet port (18) in communication with each of said pair of outlet passages (28, 30);
    a plug member (22) rotatably disposed in said main cavity, said plug member having: a wall (52) defining a bore (54) extending axially from a first end (56) of said plug member, said wall having a thickness extending radially from an interior surface (52b) to an exterior surface (52a), a dual flow aperture (78) extending radially from said bore through said wall and operable for selectively providing at least one of (1) high flow output through said primary outlet port, and (2) low flow output through said secondary outlet port, and a slot (74) extending partially inward from said exterior surface (52a) of said wall (52), said slot axially aligned to provide selective fluid communication between said inlet (26a) and one of said pair of outlet passages (28) for providing high flow output to said secondary outlet port (18).

10. A fluid valve according to claim 9, wherein said plug member (22) comprises a notch (80) adjacent to, and in fluid communication with, said dual flow aperture (78).

11. A fluid valve according to claim 10, wherein said plug member (22) is rotatable for providing fluid communication between said inlet (26) and said secondary outlet port (18) via fluid communication between one (30) of said pair of outlet passages (28, 30) and said notch (80).

12. A fluid valve according to claim 9, wherein said plug member (22) further comprises a cut-out portion (86) extending radially from said exterior surface (52a) through a portion of said wall (52) of said plug member (22), wherein said cut-out portion (86) provides selective fluid communication between said inlet (26) and said secondary outlet port (18).

13. A fluid valve according to claim 12, wherein said plug member (22) further comprises a substantially conical indent (82) adjacent to, and in fluid communication with, said cut-out portion (86).

14. A fluid valve according to claim 13, wherein said conical indent (82) is radially aligned with said dual aperture (78).

15. A fluid valve according to claim 9, wherein said slot (74) extends a depth of about ½ of said thickness of said wall (52) of said plug member (22).

16. A fluid valve according to claim 9, wherein said slot extends a distance of between about 210° to about 225° around a circumference of said plug member (22).

17. A fluid valve according to claim 9, wherein when the fluid valve is in a closed position, fluid communication is provided between said bore (54) and at least one of said primary and secondary outlets (16, 18) such that the fluid valve is not charged with fuel.

18. A fluid valve according to claim 9, wherein said plug member (22) further comprises a low flow aperture (90) operable to provide selective fluid communication between said inlet (26) and said primary outlet port (16).

19. A fluid valve according to claim 18, wherein said plug member (22) further comprises an adjustment mechanism (70) for adjusting a flow through said low flow aperture (90).

* * * * *